3,250,710
PREPARATION OF OVER-BASED SULFONATE
COMPOSITION
Mack W. Hunt, Ponca City, Okla., assignor to Continental
Oil Company, Ponca City, Okla., a corporation of
Oklahoma
No Drawing. Filed June 3, 1963, Ser. No. 284,894
9 Claims. (Cl. 252—33)

This invention relates to overbased oil-soluble polyvalent metal sulfonates and to a process for the preparation of these sulfonates and solutions thereof.

Overbased oil-soluble polyvalent metal sulfonates are presently in general use as additives for compounded motor oils and as stabilizers for vinylchloride polymers. The presently known procedures for preparing these overbased sulfonates are time-consuming and/or require expensive reagents; some methods use dispersing aids to assist in obtaining the desired overbasing, which processes although effective require an additional processing step, namely, filtration to obtain a clear, "solid-free" product. ("Solid-free" to the unaided eye of the viewer.)

Illustrative prior art procedures are set forth in Asseff et al. U.S. Patent No. 2,695,910; Terry et al. U.S. Patent No. 3,067,151 (col's 3, 4 and 7); also U.S. Patents Nos. 2,676,925, 2,716,087, 2,878,185 and 2,945,812—all related to dispersing aids which involve a filtration step.

An object of the invention is an overbased oil-soluble polyvalent metal sulfonate composition. Another object is a novel process for preparing such a composition. A particular object is a process which prepares such a composition in a shorter time than the prior art cook-in procedure. Another particular object is a process which prepares such a composition which can be easily clarified by filtering, and especially a process which prepares a clear product which does not need to be filtered. Other objects will be apparent from the detailed description of the invention.

Briefly, it has been discovered that overbased sulfonates in an easily filterable state, or even in a clear state, can be prepared by reacting an oil-soluble sulfonic acid with an inorganic polyvalent metal oxide or hydroxide in the presence of at least one of a particular class of dispersing aids. This dispersing aid may be recovered by distillation from the product containing mixture after treating the reaction product mixture with water to place the aid into condition for distillative removal as such, i.e., the original compound charged. The dispersing aid is at least one aliphatic compound having at least two functional groups, as the only functional groups present, one of which groups is either alkoxy, amino, ester, formyl, halo, hydroxy or keto and another of which groups is either alkoxy, amino, formyl, hydroxy or keto.

The process of the invention uses as the base affording material an inorganic polyvalent metal oxide or hydroxide; for example, calcium oxide or calcium hydroxide. These include the oxides and hydroxides of the metals of Groups II, III, IV and VIII of Mendeleef's Periodic Table of Elements. Particularly suitable elements are barium, cadmium, calcium, cobalt, iron, lead, magnesium, nickel, strontium, tin and zinc. More than one element may be present in the overbasing reaction zone.

As used herein, the term "overbased" means that the product contains more metal than can be accounted for on the basis of the neutral sulfonate, in the prior art, such terms as "basic," "reserve alkalinity," "complex sulfonate," and "colloidal dispersions" have been employed to denote overbasing.

Overbased sulfonate broadly can be defined as an organic sulfonate composition which contains more equivalents of metal than the equivalents based on the combining weight of the sulfonic acid.

The preferred overbased sulfonates are those in which the excess equivalents of metal are present in the overbased sulfonate at least in part as finely divided metallic hydroxide or oxide or carbonate or mixtures thereof. These overbased sulfonates are characterized by an increased metal content and normally exhibit a Base Number (hereinafter defined) corresponding approximately to the amount of metal present in excess of that required for the neutral sulfonate.

The base numbers herein were determined by the acetic acid titration method which utilizes glacial acetic acid as the solvent and a solution of perchloric acid in glacial acetic acid as the titrant. The method is especially adapted for determinations of this type since equilibria are obtained rapidly. The procedures for carrying out acetic acid titrations are outlined in Analytical Chemistry, volume 23, No. 2, February 1951, page 337, and volume 24, No. 3, March 1952, page 519. The results of the acetic acid titrations are converted to conventional base numbers, i.e., milligrams of KOH per gram of sample titrated.

The oil-soluble sulfonic acid reactant may be either a hydrocarbon sulfonic acid, i.e., one wherein the nucleus is composed only of carbon and hydrogen, or one which includes substituents as halogen, oxygen, or sulfur which do not change the essential nature of the sulfo ($-SO_3H$) group. It is preferred to use the hydrocarbon sulfonic acids.

Suitable oil-soluble hydrocarbon sulfonic acids include alkane sulfonic acid, aromatic sulfonic acid, alkaryl sulfonic acid, aralkyl sulfonic acid, and the "natural" petroleum mahogany sulfonic acids. The mahogany sulfonic acids include any of those materials which may be obtained by concentrated or fuming sulfuric acid treatment of petroleum fractions, particularly the higher boiling lubricating oil distillates and white oil distillates. The higher molecular weight petroleum oil-soluble mahogany sulfonic acids are condensed-ring compounds which condensed-rings may be aromatic or hydroaromatic in nature. Alkyl and/or cycloalkyl substituents may be present in the mahogany sulfonic acids.

Illustrative of one class of suitable hydrocarbon nuclei are the materials made by reaction of a benzene hydrocarbon with a "wax hydrocarbon." Hydrocarbons are derived from paraffin wax having an average carbon atom content of 18 to 24 or even more. Normally two of the wax hydrocarbon side-chains are present in the final product and these compounds are spoken of as diwaxbenzenes.

The term "aromatic hydrocarbon" is intended to include those hydrocarbons containing a benzene-ring or a number of condensed benzene-rings; for example, benzene, naphthalene and anthracene. Alkyl and/or cycloalkyl sidechains may be present. The term "benzene hydrocarbon" is intended to include all operative hydrocarbons containing a single benzene-ring and includes benzene itself. Particularly preferred members of this class are benzene, toluene, ethylbenzene and the xylenes.

An especially suitable hydrocarbon nucleus is afforded by the reaction product of a highly branched olefin with an aromatic hydrocarbon, in general, and a benzene hydrocarbon in particular; the products being alkylaromatic or alkylbenzene respectively. These highly branched olefins are available from the petroleum industry through polymerization of propylene and/or butylene. In the case of the low molecular weight butylene polymers, the polymer normally contains 2 to 6 units. In the case of the low molecular weight propylene polymers, the polymer normally contains 2 to 8 units.

The especially preferred alkylaromatic hydrocarbons are normally prepared by reacting the olefin with the aromatic hydrocarbon in the presence of a Friedel-Crafts type catalyst, usually aluminum chloride.

The most preferred hydrocarbon nucleus for the preparation of the sulfonic acid used in the process of the invention is obtained from the reaction product of propylene tetramer with benzene, using aluminum chloride catalyst. The reaction product contains a very wide range of alkyl-benzenes both in number of alkyl groups present and in the number of carbon atoms present in each alkyl group. A particular fraction of the reaction product is the most preferred hydrocarbon nucleus for the subsequent sulfonation reaction. This preferred alkylbenzene nucleus is given the name "postdodecylbenzene" and includes as the alkylbenzene components monododecylbenzene and didodecylbenzene in the approximate molar ratio of 2.3.

Typical characteristics of postdodecylbenzene are:

| | |
|---|---|
| Specific gravity at 38° C. | 0.8649 |
| Average molecular weight | 385 |
| Percent sulfonatable | 88 |
| A.S.T.M. (D–158 Engler), ° C.: | |
|   I.B.P. | 342 |
|   5% | 361 |
|   50% | 379 |
|   90% | 404 |
|   95% | 413 |
|   F.B.P. | 415 |
| Refractive index at 23° C. | 1.4900 |
| Viscosity at: | |
|   −10° C., centipoises | 2800 |
|   20° C., centipoises | 280 |
|   40° C., centipoises | 78 |
|   80° C., centipoises | 18 |
| Aniline point, ° C. | 69 |
| Pour point, ° C. | −32 |

It is to be understood that the hydrocarbon nucleus of the sulfonic acid used in the process of the invention may be any hydrocarbon which permits the product of an overbased oil-soluble sulfonate. It is preferred to utilize alkylaromatic hydrocarbons as the nucleus.

Especially preferred are the alkylbenzene hydrocarbons having 6–24 carbon atoms in at least one alkyl group. The lower molecular weight benzene hydrocarbons as defined earlier are preferred for the benzene portion of the alkylbenzene hydrocarbon. As was pointed out above especially suitable sulfonic acid is produced from postdodecylbenzene.

The corresponding hydrocarbon sulfonic acid is usually prepared by treating the hydrocarbon with concentrated sulfuric acid, fuming sulfuric acid or sulfur trioxide. The sulfonation of hydrocarbons is well known and details need not be given.

The dispersing aid used in the process of the invention is an aliphatic compound having at least two functional groups. These functional groups, except as hereinafter stated, may be the same type or different types. The aliphatic compound contains no functional group of a type different from the hereinafter listed functional groups. One of the functional groups is either alkoxy, (—OR); amino, (—NH$_2$); ester, (—COOR′); formyl, (—CHO); halo, (—X); hydroxy, (—OH); or keto, (=C=O). While in most instances the aliphatic compound may include two or more groups of the same type as the only functional group, in some instances it is essential that at least two different functional groups be present. Thus the aliphatic compound contains, in addition to at least one of the above defined functional group, at least one other group which is either alkoxy, amino, formyl, hydroxy or keto.

More specifically, suitable dispersing aids may be selected from one or more of the following classes of aliphatic compounds where the only carbon-carbon linkages are single bonds and the total number of carbons in the aliphatic backbone of the compound, i.e., when carbon atoms containing substituents are present, is not more than 8: aminoalcohol such as 2-aminoethanol and 2-dimethyl aminoethanol; dialkoxyalkane where alkoxy has not more than 4 carbon atoms, such as acetal (1,1-diethoxy ethane) and 1,1-dimethoxy ethane and 2,2-diethoxy propane; haloalcohol such as 1,3-dichloro-2-propanol; haloaldehyde such as chloral hydrate (trichloroacetadehyde); hydroxyaldehyde such as aldol; hydroxyketone such as 3-hydroxy-2-butanone; ketoaldehyde such as pyruvaldehyde; and ketoester where carboxyl has not more than 4 carbon atoms, such as ethyl acetoacetate; diketone such as 2,3-pentanedione, 2,3-butanedione and 2,4-pentanedione; glycols and ether glycols such as ethylene glycol and diethylene glycol.

The overbasing reaction may be carried out with the sulfonic acid, the base and the dispersing aid alone. However, it is convenient to have a diluent present in the overbasing reaction zone. Preferably this diluent is a hydrocarbon. Where a concentrate is desired, a low boiling hydrocarbon such as hexane or naphtha may be used as diluent; followed by distillative removal of the diluent, leaving overbased sulfonate product. Where the overbased sulfonate is to be used as a lubricating oil additive, the diluent, or one of them, may be a lubricating oil (mineral oil) of the type into which the product will be blended. Where the overhead sulfonate is to be used as a component of a PVC composition, the diluent oil may be of a type suitable for use as a secondary plasticizer for polyvinyl chloride.

In the contacting zone the base is present in an amount in excess of that theoretically needed to form the neutral metal sulfonate. Sufficient base is present to provide the desired degree of overbasing. The amount of overbasing possible with a given amount of base is dependent to a considerable extent on the type and amount of dispersing aid present and to some extent on temperature and time of the overbasing reaction.

The sulfonic acid, the base and the dispersing aid may be introduced into the reaction zone in toto and reacted. Better control of temperature in the reaction zone is possible with most dispersing aids by incremental addition of the aid. The incremental addition may be dropwise; separate portions; or continuous stream addition over a substantial period of the total contacting time.

The initial temperature is not critical because the overbasing reaction is exothermic and the temperature rises. However, the reaction may be carried out at a temperature of about 20° C. or even lower. Reflux temperature, at about atmospheric pressure, of the contacting-reaction zone is suitable. Commonly, the reaction temperature will be about 30°–70° C. Reaction time is normally that needed to obtain the degree of overbasing permitted by the types and amounts of materials changed. At 30°–70° C. temperature, commonly the reaction times are about 20–60 minutes; the temperature and time being selected to give about the desired amount of overbasing.

The overbasing reaction product comprises overbased metal sulfonate and dispersing aid. (The materials appear to be in at least a loose chemical combination because the aid can not be distillatively separated.) This product, if clear, can be used as is when the presence of aid is not objectionable; if the product is hazy, it should be filtered to a clean product before use.

It has been discovered that water addition to the overbasing reaction product releases the aid from chemical combination and places the aid in its original chemical condition as a free-compound. The free aid can be distillatively removed from the overbased sulfonate, water and aid mixture, along with the water normally; and the other volatile components present. Usually a hydrocarbon oil diluent is present in the overbasing reaction step and the overbased metal sulfonate is recovered from the distillation step in solution in the diluent hydrocarbon oil.

Further, it has been discovered the clarity of the water-treated product is affected by not only the amount and type of dispersion aid used but, importantly, by the manner of water addition. Apparently the manner of water addition determines the particle size of the basic solids which, effectively, provide the overbasing. Addition of the water all at once or too rapidly in a stream or into large portions gives a water-treated product which is hazy. These haze-producing particles settle on long standing or can be filtered out of the liquid.

Incremental controlled addition of water to the overbasing reaction product can produce a clear, bright overbased sulfonate product which does not require filtering. Sufficient water must be added to place the aid in its original chemical condition as a free-compound. It is to be understood that water-addition control will not produce a clear product if the dispersing aid and sulfonic acid have not brought essentially all the base added into "solution," i.e., to the unaided eye view.

The water treatment is conveniently carried out at the temperature of the product of the overbasing reaction. However, the product may be cooled to ordinary temperatures before the water addition, if desired.

In the usual cause, all the aid has not been freed simultaneously with the addition of all the water. The water-treating zone contents are usually intermingled for an additional time to ensure completion of the reaction.

In some cases, a separate aqueous phase including dissolved aid may be formed which can be separated from the product phase. Conveniently, the water, aid and other volatiles in the product phase are distilled away from the overbased sulfonate product or sulfonate-diluent solution.

The overbased metal sulfonate product may be used as such with the solid base particles in either the metal oxide or metal hydroxide form. For some uses it is preferable to have the solid base particles in the form of the metal carbonate. The carbonate is obtained easily by blowing the distillation product with carbon dioxide gas. At least the theoretical amount of $CO_2$ is used; usually the usage is 200%–500% of the theoretical. The temperature of treating may be at ordinary atmospheric temperatures or at the temperature of the distillation product.

Examples

Overbased metal sulfonate solutions were prepared according to a standardized procedure. The sulfonic acid used in the examples was postdodecylbenzene sulfonic acid.

Benzene was reacted with propylene tetramer using $AlCl_3$ catalyst at about 45° C. The total product was distilled to provide a bottoms fraction of postdodecylbenzene having the general properties set forth earlier. The postdodecylbenzene was diluted with mineral oil; the solution was treated with $SO_3$ for the sulfonation; then diluted with naphtha to aid settling of the spent acid. The combining weight of the postdodecylbenzene sulfonic acid was 470, as sodium. The final solution of sulfonic acid contained 28.3 weight percent of sulfonic acid; 23.5% of mineral oil; and 48.2% of naphtha.

200 g. of the above solution was charged to a 1-liter, 3-necked flask equipped with a stirrer, dropping funnel, thermometer and condenser. Additional mineral oil was added, 49 g., to yield a final product solution of 30% overbased metal sulfonate active material. Then 13.4 g. of calcium oxide (CaO) was added; this amount should give theoretically a 100 base number product solution. Thus about 56 weight parts of sulfonic acid; about 95 parts of mineral oil and about 13 parts of calcium oxide were charged.

The mixture was heated, with stirring to about 45° C. and 25 g. of acetal (1,1-diethoxy ethane) were added dropwise over a 30 minute period; the temperature of the flask rose to about 65° C. The acetal and calcium oxide appeared to have passed into solution.

Liquid water, 5 g., was added dropwise into the flask over a 10 minute period. Considerable heat was liberated and the contents of the flask rapidly rose to reflux temperature. The contents of the flask were stirred for about 30 additional minutes to permit complete reaction of water and return of acetal to that form as well as forming calcium hydroxide; in some cases this post-stirring was continued for about 60 minutes.

Then the flask was maintained in the range of about 150°–175° C. until volatile materials had been distilled out of the flask. Here the volatile materials were water, acetal and naphtha; the acetal was essentially all recovered during the "stripping step." The stripped solution of overbased calcium sulfonate and mineral oil was bright and clear.

The calcium hydroxide content of the stripped product solution was converted to calcium carbonate by blowing the hot stripped solution with carbon dioxide gas for about 20 minutes; in some cases times as long as about 30 minutes.

The carbon dioxide treated solution was bright and clear; no filtering was necessary. This solution—overbased sulfonate in mineral oil—had a base number of 101. Another preparation using 10 g. of acetal gave a clear solution with a base number of 99.

The solution readily dissolved in motor oils to afford overbased compounded oils; typically having a base number of about 5. Storage tests demonstrated that the $CO_2$ treated solution was stable, i.e., the solution retained its bright, clear condition.

Tests were carried on variations in the water addition procedure. Adding all the water at once or over a much shorter period resulted in a hazy water-treated product. The haze remained after both the stripping and $CO_2$ blowing steps. This haze could be removed by filtration through filter paper.

Many solutions were prepared using different dispersing aids. In general the operating conditions were as given above. The amount of aid and water added are given for each preparation. The stripping temperature was generally initially at 150° C. and ended at 175° C. In two preparations the initial temperature was about 190° C. and ended at about 210° C. In two preparations temperature range was 160° C.–185° C.

In Table 1 there are reported 20 preparations. In each preparation the metal base was added in the amount theoretically needed to obtain a 100 base number product solution. The data in the table are not to be considered as the best possible result obtainable with any dispersing aid. It was observed that the amount of aid and the amount and addition of water added did influence the degree brightness (or haze) in the final product. Table 1 shows mainly the numerous classes of compounds which function as dispersing aids.

The data demonstrate that acetal, aminoethanol, ethylene glycol, ethyl acetoacetate and pyruvaldehyde are dispersing aids which readily produce high base number bright, clear product solutions.

TABLE 1

| Dispersing aid | | Water, grams | Base | | Product [1] | |
| --- | --- | --- | --- | --- | --- | --- |
| Type | Grams | | Type | Grams | Base No. | Soln. |
| Ethylene Glycol | 10 | 10 | CaO | 13.4 | 101 | B |
| Do | 5 | 10 | MgO | 9.6 | 49 | H |
| Acetal | 25 | 5 | CaO | 13.4 | 101 | B |
| Chloral hydrate | 10 | 5 | CaO | 13.4 | 98 | H |
| Do | 10 | 5 | (2) | 17.7 | 70 | H |
| Ethyl acetoacetate | 25 | 15 | CaO | 13.4 | 116 | B |
| Aldol | 15 | 13 | CaO | 13.4 | 126 | H |
| Pyruvaldehyde [3] | 9 | 10 | CaO | 13.4 | 98 | B |
| 2,4-pentanedione | 20 | 15 | CaO | 13.4 | 79 | H |
| Hydroxybutanone | 15 | 10 | CaO | 13.4 | 29 | H |
| Dichloropropanol | 5 | 10 | CaO | 13.4 | 22 | H |
| 1,1-dimethoxyethane | 15 | 10 | CaO | 13.4 | 12 | H |
| Dimethylaminoethanol | 15 | 10 | CaO | 13.4 | 37 | H |
| 2,2-dimethoxypropane | 15 | 10 | CaO | 13.4 | 12 | H |
| 2,3-pentanedione | 15 | 10 | CaO | 13.4 | 70 | H |
| 2,3-butanedione | 15 | 10 | CaO | 13.4 | 38 | H |
| 2-aminoethanol | 15 | 10 | CaO | 13.4 | 96 | B |
| Acetal | 10 | 10 | NiO | 17.9 | 11 | H |
| Do | 10 | 5 | CaO | 13.4 | 89 | B |
| Chloral hydrate | 10 | 5 | BaO | 37.0 | 53 | H |

[1] Base No's of "H" products determined after filtering.
[2] Calcium hydroxide.
[3] 30 g. of 30% solution in water.
B—Bright, clear product, not filtered.
H—Hazy, cloudy product, bright, clear after filtering.
NOTE.—Glycol preparations were stripped beginning at 190° C.; Aldol and Pyruvaldehyde preparations at 160° C.; all other preparations at 150° C.

Thus having described the invention what is claimed is:
1. A process for preparing overbased oil-soluble polyvalent metal sulfonate which process comprises:
   A. contacting, at a temperature of about 20°–150° C., an oil-soluble sulfonic acid, an inorganic polyvalent metal oxide or hydroxide, and a dispersing aid, as essentially the only reactants, where said base is present in an amount sufficient to afford an overbased metal sulfonate product and said aid is selected from the group consisting of acetal, aminoethanol, ethylene glycol, ethyl acetoacetate and pyruvaldehyde;
   B. to the metal sulfonate containing reaction product mixture of step A, adding about 5–15 parts by weight of water substantially continuously over a time of about 10–60 minutes, said addition rate being controlled to obtain a solution from step C that is clear;
   C. distillatively removing said aid and water from an overbased oil-soluble polyvalent metal sulfonate product; and
   D. where said aid is present in an amount of about 9–25 parts by weight such that the solution from step C is clear; where aforesaid parts by weight in B, and D are based on 69 parts by weight of said acid and said oxide or hydroxide, these being present in a weight ratio of about 56 parts of said acid to about 13 parts of said oxide or hydroxide.

2. The process of claim 1 wherein a hydrocarbon oil diluent is present in said step A and said sulfonate product is recovered in step C in solution in said oil.

3. The process of claim 1 wherein said solution from step C is treated with carbon dioxide gas to convert polyvalent metal base present therein to polyvalent metal carbonate.

4. The process of claim 1 wherein said sulfonic acid is hydrocarbon sulfonic acid.

5. The process of claim 4 wherein said temperature is about 30°–70° C. and said time is about 20–60 minutes, such that the desired amount of overbasing reaction is obtained.

6. The process of claim 1, wherein said base is calcium oxide.

7. The process of claim 1 wherein said base is barium oxide.

8. A process for preparing an overbased oil-soluble calcium sulfonate which process comprises:
   (1) introducing postdodecyl sulfonic acid, mineral oil solvent, calcium oxide, and acetal in the approximate weight proportions 56:95:13:10–25, respectively, as the only reactants, into a reaction zone and contacting these at a temperature of about 45°–65° C., said acetal being introduced into said zone dropwise over a contacting period of about 30 minutes;
   (2) to the reaction product contents of said reaction zone, liquid water is then added dropwise in a weight proportion of 5 parts over a period of about 10 minutes, the temperature of said reaction zone being maintained by reflux operation and the contents of said zone being intermingled for an additional period of about 30–60 minutes;
   (3) distillatively removing volatile materials from the mixture obtained in step 2, at a temperature of about 150°–175° C. and at atmospheric pressure to obtain a solution of overbased product sulfonate; and
   (4) blowing the stripped solution from step 3 with carbon dioxide gas at elevated temperature for a time of about 20–30 minutes to convert calcium oxide to calcium carbonate, whereby a clear, bright solution of overbased calcium postdodecyl sulfonate is obtained, said solution having a base number of about 100.

9. A process for preparing an overbased oil-soluble calcium sulfonate which process comprises:
   (1) introducing postdodecyl sulfonic acid, mineral oil solvent, calcium oxide, and ethylene glycol in the approximate weight proportions 56:95:13:10, respectively, as the only reactants, into a reaction zone and contacting these at a temperature of about 45°–65° C., said glycol being introduced into said zone dropwise over a contacting period of about 30 minutes;
   (2) to the reaction product contents of said reaction zone liquid water is then added dropwise in a weight proportion of 10 parts over a period of about 10 minutes, the temperature of said reaction zone being maintained by reflux operation and the contents of said zone being intermingled for an additional period of about 30–60 minutes;
   (3) distillatively removing volatile materials from the mixture obtained in step 2, at a temperature of about 190°–210° C. and at atmospheric pressure to obtain a solution of overbased product sulfonate; and
   (4) blowing the stripped solution from step 3 with carbon dioxide gas at elevated temperature for a time of about 20–30 minutes to convert calcium oxide to calcium carbonate, whereby a clear, bright solution of overbased calcium postdodecyl sulfonate is obtained, said solution having a base number of about 100.

References Cited by the Examiner

UNITED STATES PATENTS

| | | | |
|---|---|---|---|
| 2,485,861 | 10/1949 | Campbell et al. | 252—33 |
| 2,501,731 | 3/1950 | Mertes | 252—33 |
| 2,616,904 | 11/1952 | Asseff et al. | |
| 2,920,105 | 1/1960 | Kluge et al. | |
| 3,027,325 | 3/1962 | McMillen et al. | 252—33 |
| 3,057,896 | 10/1962 | Schlicht et al. | |

FOREIGN PATENTS

| | | |
|---|---|---|
| 782,058 | 8/1957 | Great Britain. |
| 835,682 | 5/1960 | Great Britain. |

DANIEL E. WYMAN, *Primary Examiner.*

J. R. McBRIDE, P. P. GARVIN, *Examiners.*